United States Patent
Howard

(10) Patent No.: US 8,549,439 B2
(45) Date of Patent: Oct. 1, 2013

(54) VIEWPORT OVERLAYS TO EXPOSE ALTERNATE DATA REPRESENTATIONS

(75) Inventor: Richard D. Howard, Kentfield, CA (US)

(73) Assignee: Autodesk, Inc., San Rafael, CA (US)

( * ) Notice: Subject to any disclaimer, the term of this patent is extended or adjusted under 35 U.S.C. 154(b) by 722 days.

(21) Appl. No.: 12/286,911

(22) Filed: Oct. 3, 2008

(65) Prior Publication Data

US 2009/0094558 A1 Apr. 9, 2009

Related U.S. Application Data

(60) Provisional application No. 60/997,868, filed on Oct. 5, 2007.

(51) Int. Cl.
*G06F 3/048* (2013.01)

(52) U.S. Cl.
USPC ........... 715/848; 715/721; 715/757; 715/839; 715/964

(58) Field of Classification Search
USPC .................. 715/848, 850, 852, 721, 757, 964
See application file for complete search history.

(56) References Cited

U.S. PATENT DOCUMENTS

| | | | | |
|---|---|---|---|---|
| 5,148,154 A | * | 9/1992 | MacKay et al. | 715/782 |
| 5,226,109 A | * | 7/1993 | Dawson et al. | 345/420 |
| 5,295,243 A | * | 3/1994 | Robertson et al. | 715/848 |
| 5,461,709 A | * | 10/1995 | Brown | 715/848 |
| 5,473,747 A | * | 12/1995 | Bird et al. | 715/848 |
| 5,767,854 A | * | 6/1998 | Anwar | 715/848 |
| 5,767,855 A | * | 6/1998 | Bardon et al. | 715/848 |
| 5,999,165 A | * | 12/1999 | Matsumoto | 345/157 |
| 6,018,350 A | | 1/2000 | Lee et al. | |
| 6,147,686 A | * | 11/2000 | Brown et al. | 715/839 |
| 6,339,429 B1 | | 1/2002 | Schug | |
| 6,915,310 B2 | | 7/2005 | Gutierrez et al. | |
| 7,058,896 B2 | | 6/2006 | Hughes | |
| 7,170,510 B2 | | 1/2007 | Kawahara et al. | |
| 7,181,362 B2 | | 2/2007 | Ratti et al. | |
| 7,263,667 B1 | | 8/2007 | Hoellerer et al. | |
| 7,528,938 B2 | * | 5/2009 | Garceau et al. | 356/4.01 |
| 7,567,844 B2 | | 7/2009 | Thomas et al. | |
| 7,693,702 B1 | | 4/2010 | Kerner et al. | |

(Continued)

OTHER PUBLICATIONS

Toolglass and Magic Lenses: The SeeThrough Interface; by EA Bier—1993—Cited by 1066—Related articles Eric A. Bier, Maureen C. Stone, Ken Pier, William Buxton†, Tony D. DeRose‡ Xerox PARC, 3333 Coyote Hill Road, Palo Alto, CA 94304.*

(Continued)

*Primary Examiner* — Nicholas Augustine
*Assistant Examiner* — Meseker Takele
(74) *Attorney, Agent, or Firm* — Gates & Cooper LLP

(57) ABSTRACT

A method, apparatus, and article of manufacture provide the ability to display (using a 3D graphics application) an overlayed window containing an alternate data representation in a three-dimensional system. A first 3D view of a real world scene (that includes a first set of data layers) is displayed on a display device. The user selects a set of entities that together define an alternate representation of the first 3D view. The alternate representation is a second set of data layers that is different than the first set of data layers. An overlayed window is displayed on top of the first 3D view and displays the alternate representation.

15 Claims, 11 Drawing Sheets
(7 of 11 Drawing Sheet(s) Filed in Color)

(56) References Cited

U.S. PATENT DOCUMENTS

| | | | |
|---|---|---|---|
| 7,710,418 B2 | | 5/2010 | Fairclough |
| 7,856,312 B2 * | | 12/2010 | Coombes et al. ............. 701/208 |
| 7,865,836 B1 | | 1/2011 | Sperlongano et al. |
| 2003/0057887 A1 | | 3/2003 | Dowling et al. |
| 2005/0091596 A1 | | 4/2005 | Anthony et al. |
| 2005/0110788 A1 | | 5/2005 | Turner et al. |
| 2005/0223337 A1 * | | 10/2005 | Wheeler et al. ............. 715/806 |
| 2006/0075356 A1 | | 4/2006 | Faulkner et al. |
| 2006/0176303 A1 | | 8/2006 | Fairclough |
| 2006/0209061 A1 | | 9/2006 | Burch et al. |
| 2007/0132779 A1 | | 6/2007 | Gilbert |
| 2007/0143345 A1 | | 6/2007 | Jones et al. |
| 2007/0150198 A1 | | 6/2007 | MacDonald |
| 2007/0176926 A1 | | 8/2007 | Garcia et al. |
| 2007/0219645 A1 * | | 9/2007 | Thomas et al. ................ 700/29 |
| 2008/0016472 A1 * | | 1/2008 | Rohlf et al. ................... 715/848 |
| 2008/0140271 A1 * | | 6/2008 | Garceau et al. ................ 701/10 |
| 2008/0215414 A1 * | | 9/2008 | Fehnel et al. ................... 705/10 |
| 2008/0215415 A1 | | 9/2008 | Willms |
| 2008/0292213 A1 * | | 11/2008 | Chau ............................ 382/294 |
| 2009/0019366 A1 | | 1/2009 | Abhyanker |
| 2009/0094556 A1 | | 4/2009 | Howard et al. |
| 2010/0164974 A1 | | 7/2010 | Fairclough |
| 2011/0279470 A1 | | 11/2011 | Fairclough |

OTHER PUBLICATIONS

International Search Report mailed Nov. 12, 2008, International application No. PCT/US2008/078821, International filing date Mar. 10, 2008.

International Search Report mailed Aug. 12, 2008, International application No. PCT/US2008/078797, International filing date Mar. 10, 2008.

Clausters, Luc; Romain, Cyril; Sanchez, David; 9. Interactive Authoring of Interactive Stories, Datasheet [online], inScape storytelling, Feb. 2006, version 2.0 (retrieved on Nov. 20, 2008). Retrieved from the Internet: <URL: http://www.inscapers.com/pdfs/9_authoring.pdf>, pp. 102-224.

Oh, John Kie Whan; Haberl, Jeff S.; "New MS-Windows-Based Educational Software for Teaching the Sunpath Diagram and Shading Mask Protractor". Energy Systems Laboratory, Department of Architecture, Texas A&M University, College Station; May 13-14, 1996; pp. 262-268.

Kie et al., "New MS-Windows-based educational software for teaching the sunpath diagram and shading mask protractor," Conference Proceedings (online), 1996, retrieved from the internet on Nov. 24, 2008, http://repository.tamu.edu/bitstream/handle/1969.1/6694/ESL-HH-96-05-30.pdf?sequence=1.

International Search Report dated Dec. 5, 2008, International application No. PCT/US08/78795, International filing date Oct. 3, 2008.

Office Action of U.S. Appl. No. 12/245,562 mailed Aug. 18, 2011.

Amendment Under 37 C.F.R. 1.111 of U.S. Appl. No. 12/245,562 e-filed Nov. 17, 2011.

Final Office Action dated Feb. 23, 2012 from U.S. Appl. No. 12/245,562.

Bier et al. "Toolglass and Magic Lenses: The See-Through Interface". Xerox PARC, 3333 Coyote Hill Road, Palo Alto CA 94304, University of Toronto, University of Washington, 1993, pp. 73-80.

International Search Report and Written Opinion of the International Searching Authority mailed Dec. 8, 2008 for international application No. PCT/US08/78797.

U.S. Appl. No. 12/245,568.

Amendment under 37 CFR 1.116 filed with USPTO Apr. 23, 2012 for U.S. Appl. No. 12/245,562.

Advisory Action mailed on May 4, 2012 for U.S. Appl. No. 12/245,562.

Amendment under 37 CFR 1.114 and Request for Continued Examination filed with USPTO Jun. 6, 2012 for U.S. Appl. No. 12/245,562.

International Search Report and Written Opinion of the International Searching Authority mailed Dec. 11, 2008 for international application No. PCT/US2008/078821.

* cited by examiner

VIEWPORT OVERLAYS TO EXPOSE ALTERNATE DATA REPRESENTATIONS

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 60/997,868, filed Oct. 5, 2007, by RICHARD D. HOWARD, JARROD LOPICCOLO, GRANT ANDERSON, ROY LINDAUER, THOMAS HELMAN, and MATTHEW LARSEN, entitled "FRAMEWORK FOR AGGREGATING DESIGN MODELS AND GIS DATA IN A GEOSPATIAL ENVIRONMENT,"

This application is related to the following co-pending and commonly-assigned patent application, which application is incorporated by reference herein:

U.S. patent application Ser. No. 12/245,562, entitled "USER DEFINED SCENARIOS IN A THREE DIMENSIONAL GEO-SPATIAL SYSTEM", by Richard D. Howard, Jarrod Lopiccolo, Grant Anderson, Roy Lindauer, Thomas Helman, and Matthew Larsen, filed on the same date herewith; and U.S. patent application Ser. No. 12/245,568, entitled "SUN-SHADOW SIMULATION IN A GEOSPATIAL SYSTEM", by Richard D. Howard, filed on the same date herewith.

BACKGROUND OF THE INVENTION

1. Field of the Invention

The present invention relates generally to three-dimensional (3D) applications, and in particular, to a method, apparatus, and article of manufacture for viewing an alternate representation of data in a geospatial system without losing the context of a main data representation.

2. Description of the Related Art

Geographic information systems (GIS) are commonly used and generally refer to an information system that integrates hardware, software and data in order to capture, store, analyze, manage, and display/present data that is spatially referenced (i.e., linked to location or is geographically referenced). GIS systems commonly provide a two dimensional (2D) visualization of data in the form of maps, globes, reports, and charts. However, prior art GIS systems fail to provide the capability to merge GIS data with additional information in order to visualize, analyze, and simulate trends, phenomena, states, and events. Further, three-dimensional (3D) systems also fail to provide such capabilities.

In addition, it may be desirable to view different data sets in the same user interface. For example, a user may desire to view a geospatial map while also viewing the underlying sewage system or traffic patterns on such a map. However, prior art systems often either present mutually exclusive data sets (i.e., the user must elect a single data set to view) or alternatively, must select which data sets to view for the entire graphical user interface. For example, traditionally, systems that allow users to view different data sets in the same user interface required that the user (1) select the data to be displayed, (2) select "OK", and (3) close a dialog. Once completed, the view of the entire user interface is based on the selected set(s) of data. What is desirable is the capability to view different sets of data in the same user interface in an easy, efficient, and user understandable manner.

SUMMARY OF THE INVENTION

One or more embodiments of the invention employ the idea of lenses that overlay a base model view with alternate layers of information. The lenses provide a window into an alternate representation without losing the context of the main data representation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide an application and development framework for aggregating design models and GIS data within an immersive 3D geospatial environment for the purposes of visualizing, analyzing, and simulating trends, phenomena, state, and events in ways that are not possible within conventional 2D GIS or existing 3D application software. In other words, embodiments of the invention provide the ability to view, analyze, simulate trends, pheonmena, states, and events in a digital city.

The benefits of the embodiments of the invention include:

3D Geospatial Environment containing both simplified and fully textured rendition based on high resolution lidar and ortho-photography for content such as Digital Terrain Models, Streets and Roadways, Water Features, Railways, Buildings, Utility Infrastructure, and Street Furniture;

Importation, storage, and data mapping of full 3D design models from various software (e.g., software available from the assignee of the present invention including AutoCAD™, Map3D™, Revit™, Architecture™, Civil3D™, and Inventor™, as well as support for GIS formats via Autodesk™ Feature Data Objects (FDO)™ technology);

Real-time 3D rendering and animation including transparency, reflections, lights, shadows, and atmospheric effects;

Smooth motion control and 6-axis navigation;

Object visibility, stylization, and transparency for all content;

Linking to tabular information and ODBC data sources;

Ability to apply local override of any model, data, or visualization attribute or setting;

A plug-in architecture for analysis and simulation modules;

An online catalog that provides search, download, and immediate use of models, data, and plug-ins;

"What If" scenario creation using a combination of models, data, plug-ins, and overrides;

Tabular reports and charting of data values; and

Publishing of specific scenarios for viewing on the web.

Hardware and Software Environment

Figure 1:
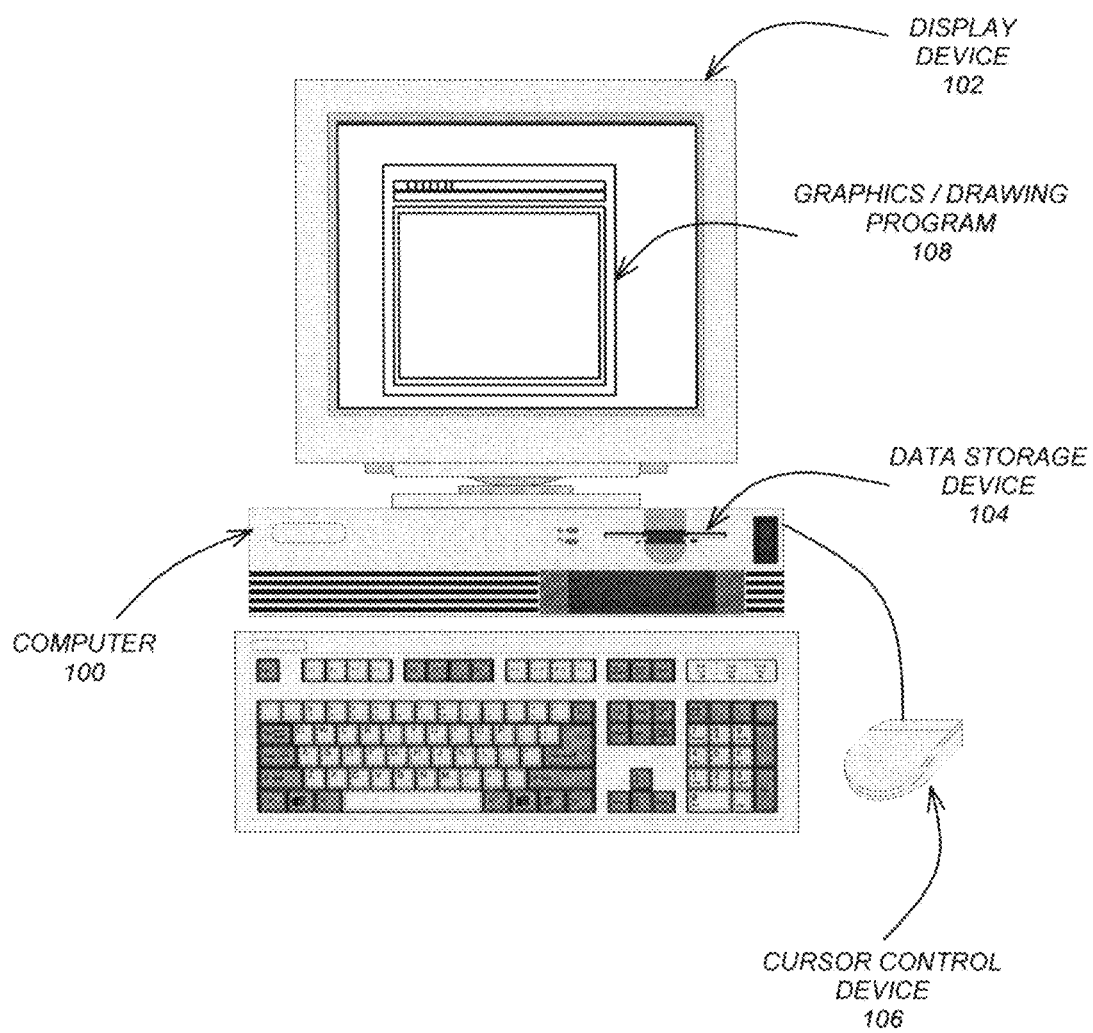
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

In one or more embodiments, instructions implementing the graphics program 108 are tangibly embodied in a computer-readable medium, e.g., data storage device 104, which could include one or more fixed or removable data storage devices, such as a zip drive, floppy disc drive, hard drive, CD-ROM drive, DVD drive, tape drive, etc. Further, the graphics program 108 is comprised of instructions which, when read and executed by the computer 100, causes the computer 100 to perform the steps necessary to implement and/or use the present invention. Graphics program 108 and/or operating instructions may also be tangibly embodied in a memory and/or data communications devices of computer 100, thereby making a computer program product or article of manufacture according to the invention. As such, the terms "article of manufacture" and "computer program product" as used herein are intended to encompass a computer program accessible from any computer readable device or media.

Figure 2:
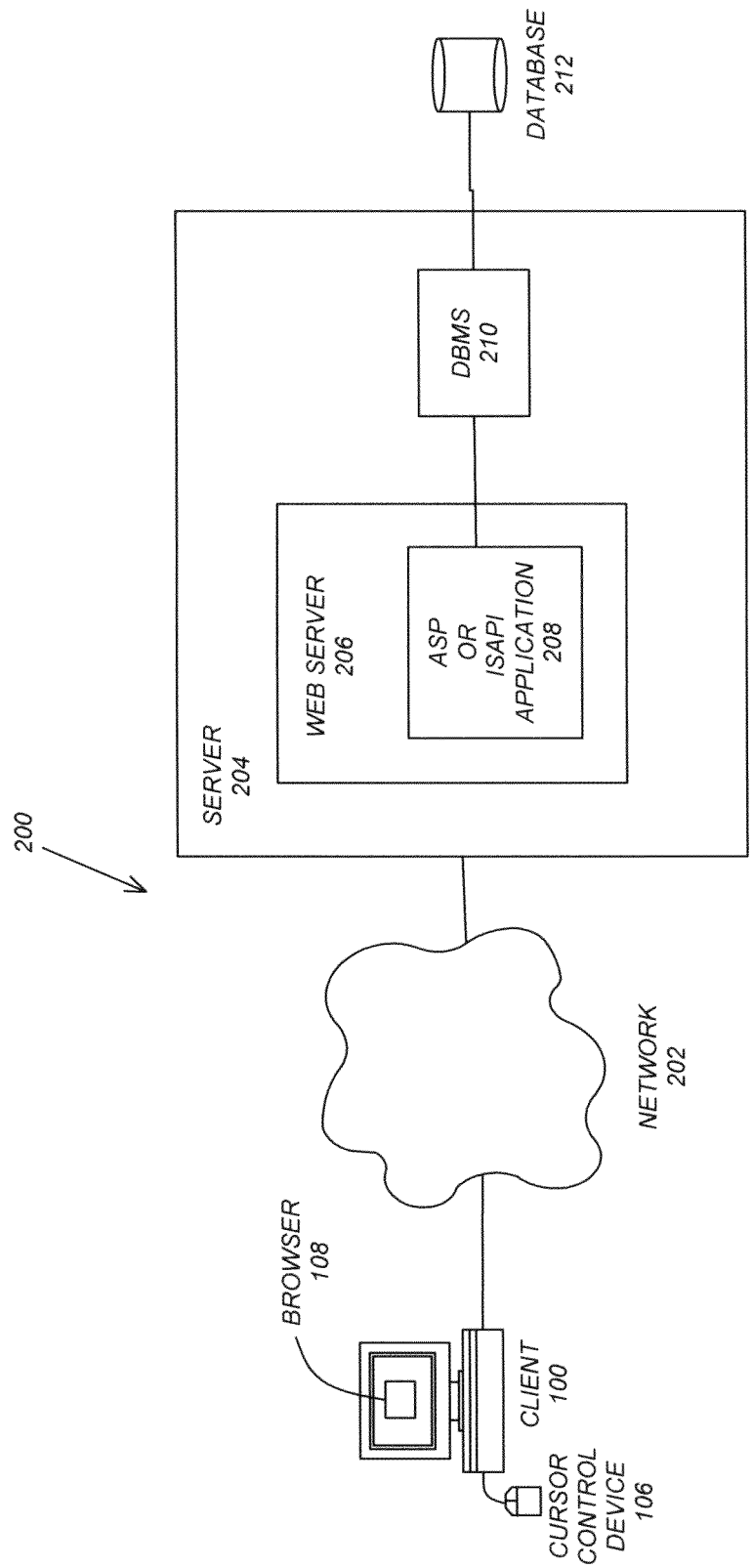
FIG. 2 schematically illustrates a further hardware and software environment in accordance with one or more embodiments of the invention.

FIG. 2 schematically illustrates a further hardware and software environment in accordance with one or more embodiments of the invention, and more particularly, illustrates a typical distributed computer system 200 using a network 202 to connect client computers 100 to server computers 204. A typical combination of resources may include a network 202 comprising the Internet, LANs (local area networks), WANs (wide area networks), SNA (systems network architecture) networks, or the like, clients 100 that are personal computers or workstations (e.g., as described above), and servers 204 that are personal computers, workstations, minicomputers, or mainframes. Additionally, both client 100 and server 204 may receive input (e.g., cursor location input) and display a cursor in response to an input device such as cursor control device 106.

A network 202 such as the Internet connects clients 100 to server computers 204. Additionally, network 202 may utilize radio frequency (RF) to connect and provide the communication between clients 100 and servers 204. Clients 100 may execute a client application or Web browser 108 (e.g., as described above) and communicate with server computers 204 executing Web servers 206. The software executing on clients 100 may be downloaded from server computer 204 to client computers 100 and installed as a plug in or ActiveX control of a Web browser. Accordingly, clients 100 may utilize ActiveX components/component object model (COM) or distributed COM (DCOM) components to provide a user interface on a display of client 100.

Web server 206 may host an Active Server Page (ASP) or Internet Server Application Programming Interface (ISAPI) application 208, which may be executing scripts. The scripts invoke objects that execute business logic (referred to as business objects). The business objects then manipulate data in database 212 through a database management system (DBMS) 210. Alternatively, database 212 may be part of or connected directly to client 100 instead of communicating/obtaining the information from database 212 across network 202. When a developer encapsulates the business functionality into objects, the system may be referred to as a component object model (COM) system. Accordingly, the scripts executing on web server 206 (and/or application 208) invoke COM objects that implement the business logic. Further, server 204 may utilize Microsoft's Transaction Server (MTS)™ to access required data stored in database 212 via an interface such as ADO (Active Data Objects), OLE DB (Object Linking and Embedding DataBase), or ODBC (Open DataBase Connectivity).

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Computer-Implemented Graphics Program

Figure 3:
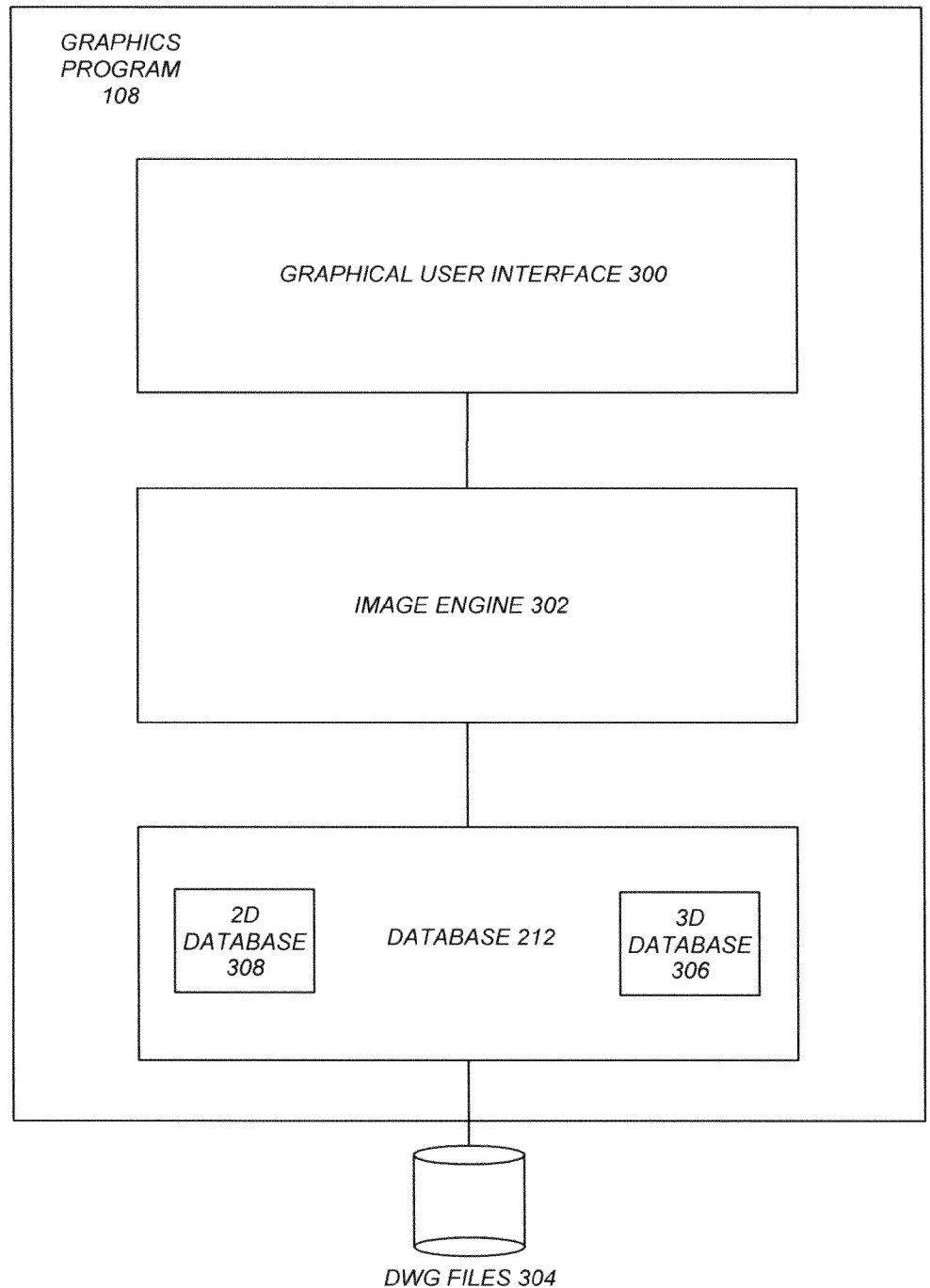
FIG. 3 is a block diagram that illustrates the components of the graphics program of FIG. 2 in accordance with one or more embodiments of the invention.

FIG. 3 is a block diagram that illustrates the components of the graphics program 108 in accordance with one or more embodiments of the invention. There are three main components to the graphics program 108, including: a Graphical User Interface (GUI) 300, an Image Engine (IME) 302, and a DataBase (DB) 212 for storing objects in Drawing (DWG) files 304.

The Graphical User Interface 300 displays information to the operator and provides the functionality for the operator's interaction with the graphics program 108.

The Image Engine 302 processes the DWG files 304 and delivers the resulting graphics to the monitor 102 for display. In one or more embodiments, the Image Engine 302 provides a complete application programming interface (API) that allows other computer programs to interface to the graphics program 108 as needed. The Database 212 is comprised of two separate types of databases: (1) a 3D database 306 known as the "3D world space" that stores 3D information; and (2) one or more 2D databases 308 known as the "2D view ports" that stores 2D information derived from the 3D information.

As used herein, the graphics program 108 may consist of a variety of different type of applications including GIS, CAD (computer aided design), solid modeling systems, animation products, rendering systems, etc. Embodiments of the invention are not limited to those software applications explicitly described herein but by the limitations set forth in the claims.

Plug-In Modules

Embodiments of the invention provide an architecture and method of using plug-in modules for user defined 3D/4D visualization, analysis, and simulation. Users/clients 100 are provided with the ability to search for, download, and immediately use plug-ins from an online catalog offered by one or more servers 204. These plug-ins can be supplied by software developers and enable users 100 to visualize, analyze, and simulate trends, phenomena, state, and events via software application 108.

Such a plug-in environment allows many different types of applications 108 to load specific data types and allows interaction between those data types. Most "traditional" plug-in environments do not allow this. Plug-ins for different data types may include textures, 3D models, 2D models, particle systems, and geo-based behavior systems (behaviors based on specific geo information).

Another advantage of the plug-in architecture is that it allows user to load models seamlessly without having to go through the lengthy steps of importing files. Accordingly, a full 3D environment and real-time rendering capability of embodiments of the invention combined with the analytic capabilities supplied by a plug-in developer allows user to visualize their data in ways not formerly possible.

Plug-ins are loaded and associated with specific models and scenarios within the digital city of embodiments of the invention. A user can override model and linked data values, enter plug-in parameters, and control the visualization of results. Plug-ins have the ability to automatically add themselves or make calculations based on the data of a particular file making up a digital city environment.

For example, based on GIS fault data, an earthquake preparedness drill particle system could be suggested and/or instantiated. Another example would be a recommended parking configuration based on the number of roads, or total lanes adjacent to a particular structure. Alternatively, a road configuration could be suggested based on the parking structures and parking places in a given city block.

Figure 4:
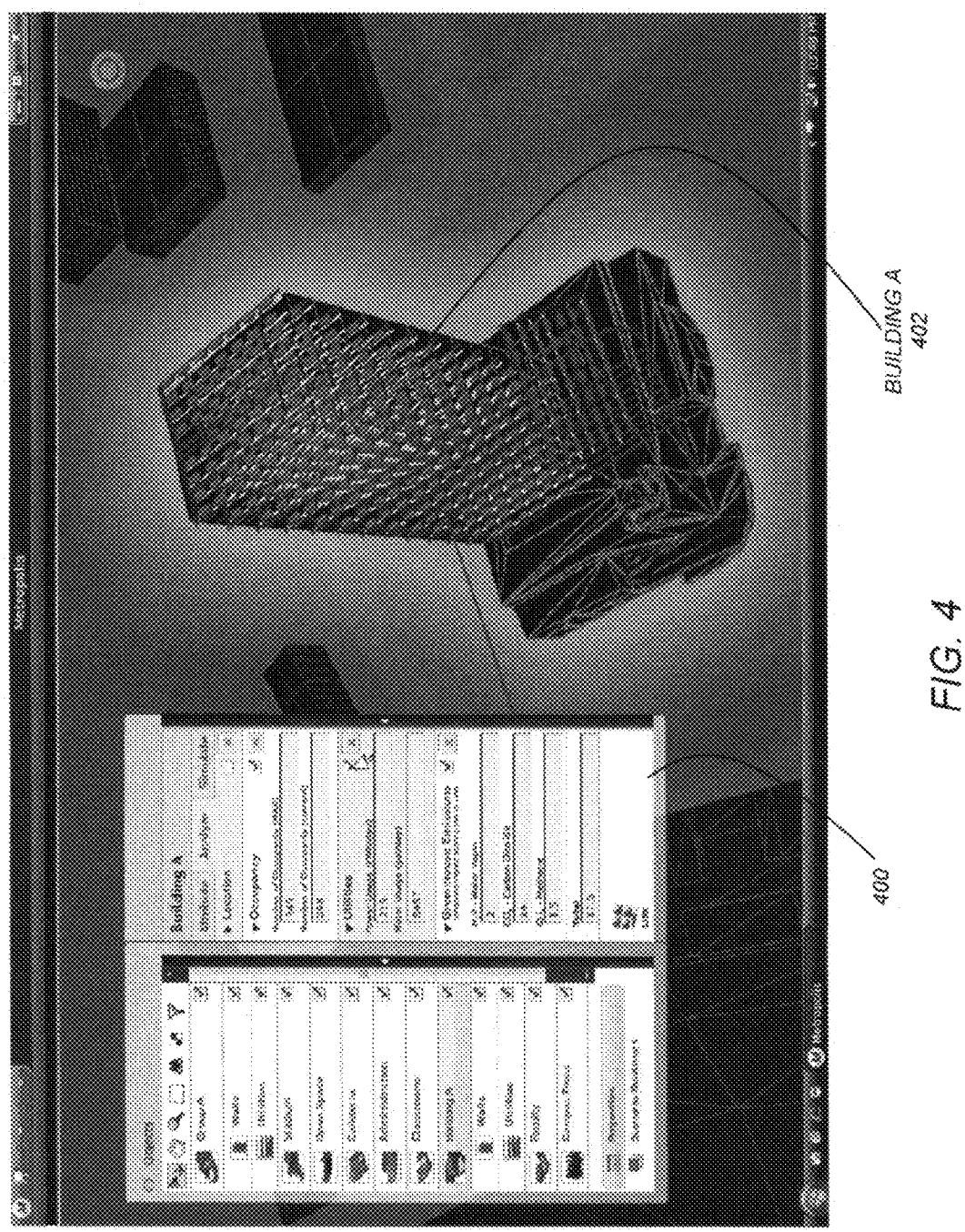
FIG. 4 illustrates an example panel containing multiple plug-ins in accordance with one or more embodiments of the invention.

FIG. 4 illustrates an example panel containing multiple plug-ins. As illustrated, there is a location plug-in, a utilities plug-in, and a greenhouse emissions plug-in. Each plug-in can interact with data established in other plug-ins and use such data in conducting calculations. Panel 400 of FIG. 4 illustrates the resulting display when three plug-ins are utilized together to analyze greenhouse gas emissions based on building occupancy and utility consumption for a selected building in accordance with one or more embodiments of the invention. Panel 400 allows the user to set various options in the various plug-ins for analyzing the green house emissions of building A 402.

Figure 5:
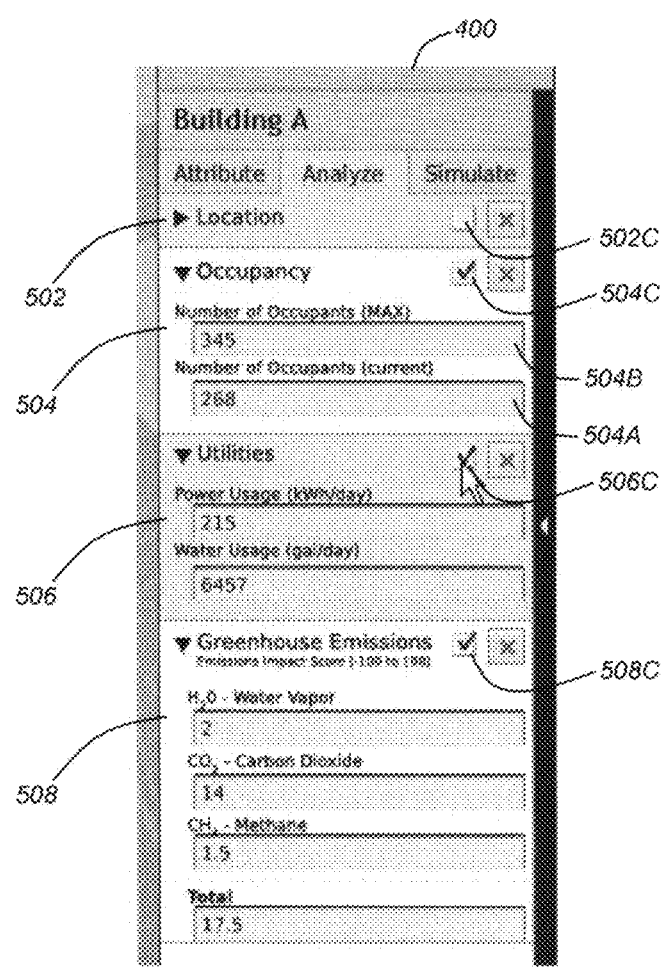
FIG. 5 is an enlargement of a panel of FIG. 4 illustrating several plug-ins available to analyze the currently selected object in accordance with one or more embodiments of the invention.

FIG. 5 is an enlargement of panel 400 of FIG. 4 illustrating several plug-ins available to analyze the currently selected object (i.e., Building A) in accordance with one or more embodiments of the invention.

The location plug-in 502 contains the display and overrides to the geospatial location and position information for the building. In this regard, if location panel 502 were expanded, the user would have the option of specifying where Building A is located. For example, the user can specify the latitude, longitude, and elevation. Alternatively, the user can enter an address (e.g., number, street, city, state, and/or zip, etc.). Further, entering information in one field of the location panel 502 may automatically retrieve and output information in another field (e.g., entry of an address may automatically fill in the corresponding latitude, longitude, and elevation. In addition, once the location information is entered, the object (e.g., Building A 402) would automatically move to the location specified. The resulting visualization from the location plug-in 502 provides a visual representation of Building A 402 in a 3D environment.

The occupancy plug-in 504 allows the user to establish the current number of occupants 504A to be displayed and overrides 504B (i.e., the maximum number of occupants) to the number of occupants for Building A 402. The visualization of the occupancy plug-in 504 would provide for multiple dots indicative of persons in Building A 402 (or distributed throughout building A 402).

The utilities plug-in 506 contains the display and overrides to the utility usage (i.e., water and power) for Building A 402. The visualization of the utilities plug-in results in line or effect simulating power and water usage in Building A 402.

The greenhouse emissions plug-in 508 contains the display and overrides to the LEED (Leadership in Energy and Environmental Design green building rating system) emissions impact score for the Building A 402. The values on greenhouse emissions panel 508 are automatically (i.e., without additional user input) updated based on the occupancy (panel 504) and utility consumption (panel 506) for a selected building. Alternatively, the user may have the options of setting the greenhouse emissions values in panel 508 and the system can automatically adjust either the occupancy values 504 or utility values 506 that are necessary to reach the greenhouse emissions values set forth in panel 508. In this regard, the user can determine which values/panels (502, 504, 506, and 508) are locked and which can be adjusted depending on the values specified in the other panels. The visualization of greenhouse emissions plug-in 508 would result in a halo type effect displayed around and emanating from Building A 402.

Accordingly, developers and plug-in authors can harness to the full power of 3D rendering to convey the results of their calculations. In this regard, the 3D simulation illustrated in FIG. 4 may change its coloring or areas displayed based on the visualizations resulting from plug-ins 402-508. Check boxes 502C-508C may be utilized to determine whether a resulting visualization for the respective plug-in 502-508 is displayed in the 3D rendering of FIG. 4. For example, the user may check boxes (e.g., check boxes 502C, 504C, 506C, and 508C) within panel 400 to determine which plug-ins will be reflected in the display of building A 402 of FIG. 4. This allows users to visualize and analyze their data in new and powerful ways.

One or more embodiments of the invention use plug-ins to create animations that simulate results over time (4D). In addition, plug-ins can be used to simulate human behavior in the 3D environment. Given some human interaction and a stimulus in that environment, the plug-in architecture allows a user to predict and visualize certain human behaviors. The architecture also allows the user to visualize different temporal simulations like the sun and moon, weather patterns and phenomena such as tornadoes and snowfall (see detailed examples below).

Visual Bookmarking

One or more embodiments of the invention all the user to define scenarios that incorporate specific model and linked data overrides, plug-ins and their settings, and visualization traits. In other words, a group of settings are stored into a type of visual "bookmark" that allows the user to define specific "what-if" scenarios. Each scenario or "bookmark" captures specific model and linked data overrides supplied by the user, a set of plug-ins and their settings, and visualization parameters and traits.

By bookmarking scenarios and sub-scenarios with different settings, the user can quickly compare and analyze their information and make informed decisions. This essentially allows a user to save certain data sets, apply them to scenes <environments, geoviews> recall them and compare and contrast. In the prior art, to visualize and compare different scenarios, the users were required to modify a file, save it with a certain criteria, render it and repeat the process for each different scenario and comparing the final renderings. The ability to store the various settings into a bookmark is faster and interactive so the user is not required to save files using different settings.

Figure 6:
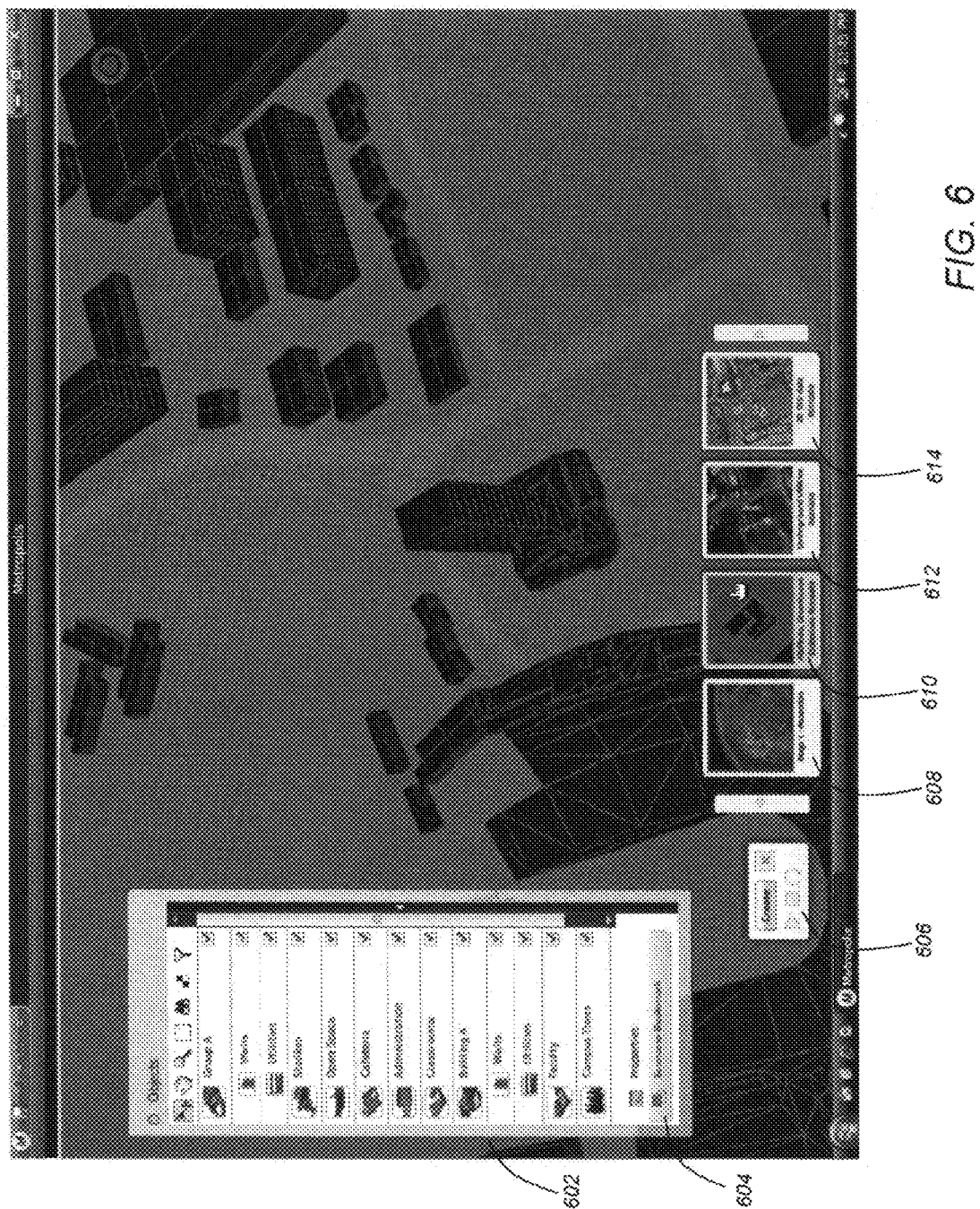
FIG. 6 illustrates various bookmarked scenarios that are selectable by a user in accordance with one or more embodiments of the invention.

FIG. 6 illustrates various bookmarked scenarios that are selectable by a user in accordance with one or more embodiments of the invention. The user first establishes all of the desired settings by selecting a particular data set, plug-ins and their settings, properties, data overrides, visualization traits, etc. in dialog box 602. Such values may be entered directly or can be linked by establishing a link between a property and an external file (e.g., a spreadsheet that contains values).

Alternatively, the user can select the scenario bookmark 604 in panel 602 which allows the user to select a set of predefined settings. Once the desired properties for a bookmark have been established (i.e., in dialog box/panel 602), the user can opt to create a bookmark to associate all of the settings with a bookmark, placeholder, or thumbnail for those settings using dialog box 606. Once created and if in the appropriate mode, the user may be presented with a group of selectable icons or menu options representative of the various bookmarks that have been established. For example, icons 608, 610, 612, and 614 are representative of various bookmarked scenarios that have been established by a user. Thus, each scenario represented by bookmarked icons 608-614 provides a selection of one or more plug-ins, and properties/settings that permit the user to define a particular visualization in a 3D/4D environment.

In view of the above, bookmarked scenarios can be viewed as a way of storing both a set of data (a specific set of models that have been loaded into a server) into a name, a set, with a series of plug-ins and potentially some overriding information for those plug-ins.

Viewport Overlays

As described above, it is often desirable to view a different/alternate representation of data while maintaining the context of the main data representation. For example, when displaying a map or a 3D view of a real world scene, it may be desirable to show a view depicting the underground utilities in a particular area of the scene.

One or more embodiments of the invention employ the idea of lenses that overlay a base model view to expose alternate data representations or alternate layers of information. The lens is used to offer a window into an alternate representation without losing the context of the main representation. For example, a utility lens may allow the viewing of a subset of layers looking through the model to underlying layers. In addition to the utilities being represented, colors can represent utility usage within a building. Thus, while simultaneously viewing the alternate data representation, the user can active a simulation over time for the elements viewed through the lens. In this regard, a user can turn on or of water, gas, waste, or electricity as desired and view the simulated result through the lens. Alternatively, the user can turn off certain water lines and view the resulting effect in the 3D visualization.

Figure 7:
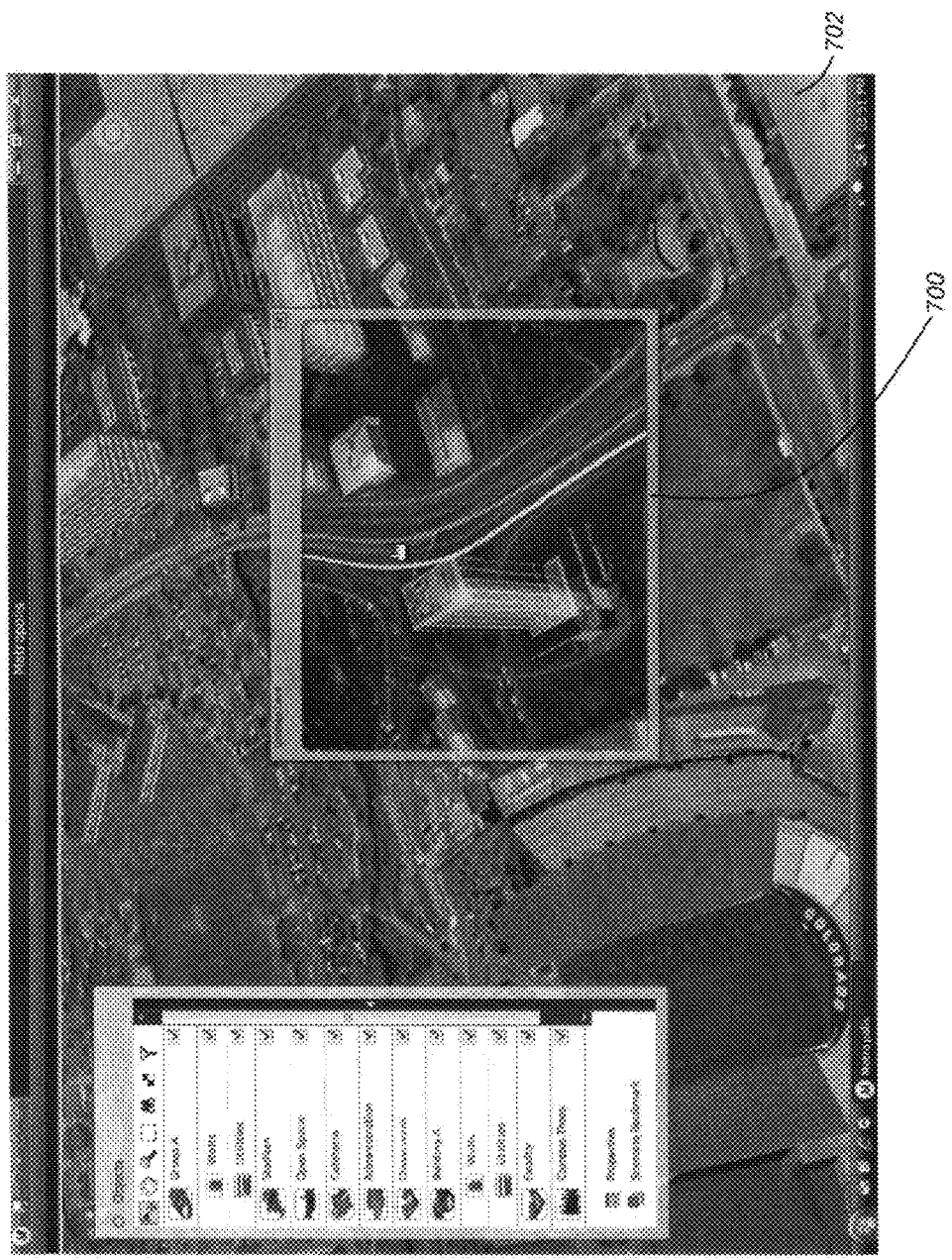
FIG. 7 is an example lens illustrating underground utilities in accordance with one or more embodiments of the invention.

FIG. 7 is an example lens illustrating underground utilities in accordance with one or more embodiments of the invention. As can be seen, lens 700 allows a view of an alternate set of data than that displayed in the main data representation 702. While the main data representation 702 shows the 3D scene from a surface perspective, utility lens 700 illustrates the underlying utilities. The different utilities are utility usage are reflected in the lens 700 via different colors. The building in the middle of utility lens 700 also has different coloring to further reflect utility usage within the building. Simulations may also be performed to indicate the utility usage over a defined period of time (e.g., particular time of day, an average per day, a particular time of year, a calendar period/interval [e.g., a season such as the summer or Winter], etc.). To perform such a simulation, a plug-in may be installed and used to produce a timeline. As such a timeline is traversed (e.g., using a timeline slider), the utility usage (or whatever item of interest is displayed in the lens 700) is dynamically and automatically (e.g., without additional user input) updated to reflect the utility usage or desired effect within the lens 700. However, such capabilities may also be a function of the underlying application and may not require a plug-in.

Figure 8A:
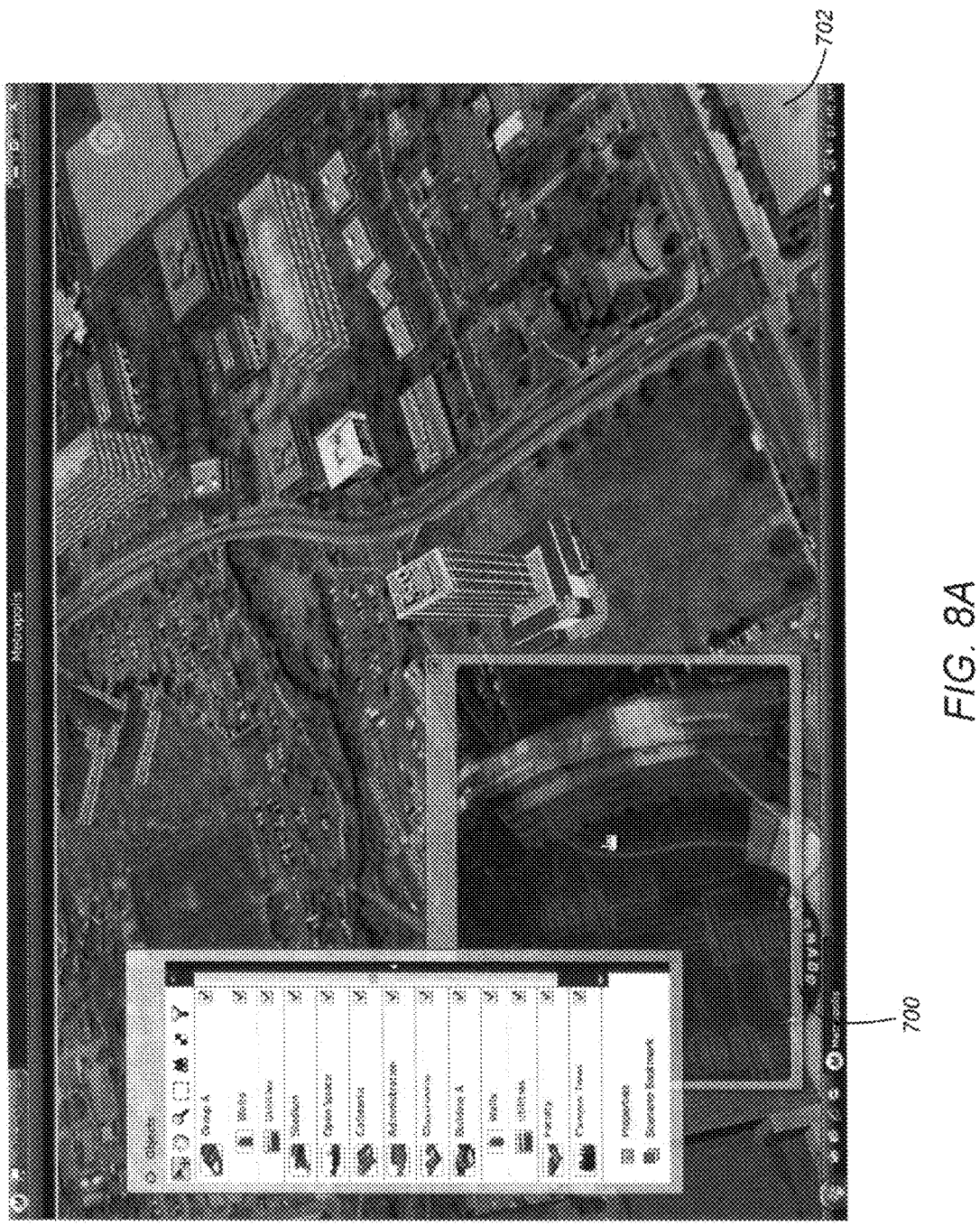
FIG. 8A illustrates the result after the lens of FIG. 7 is dragged/moved to the lower left corner of the main data representation display in accordance with one or more embodiments of the invention.
Figure 8B:
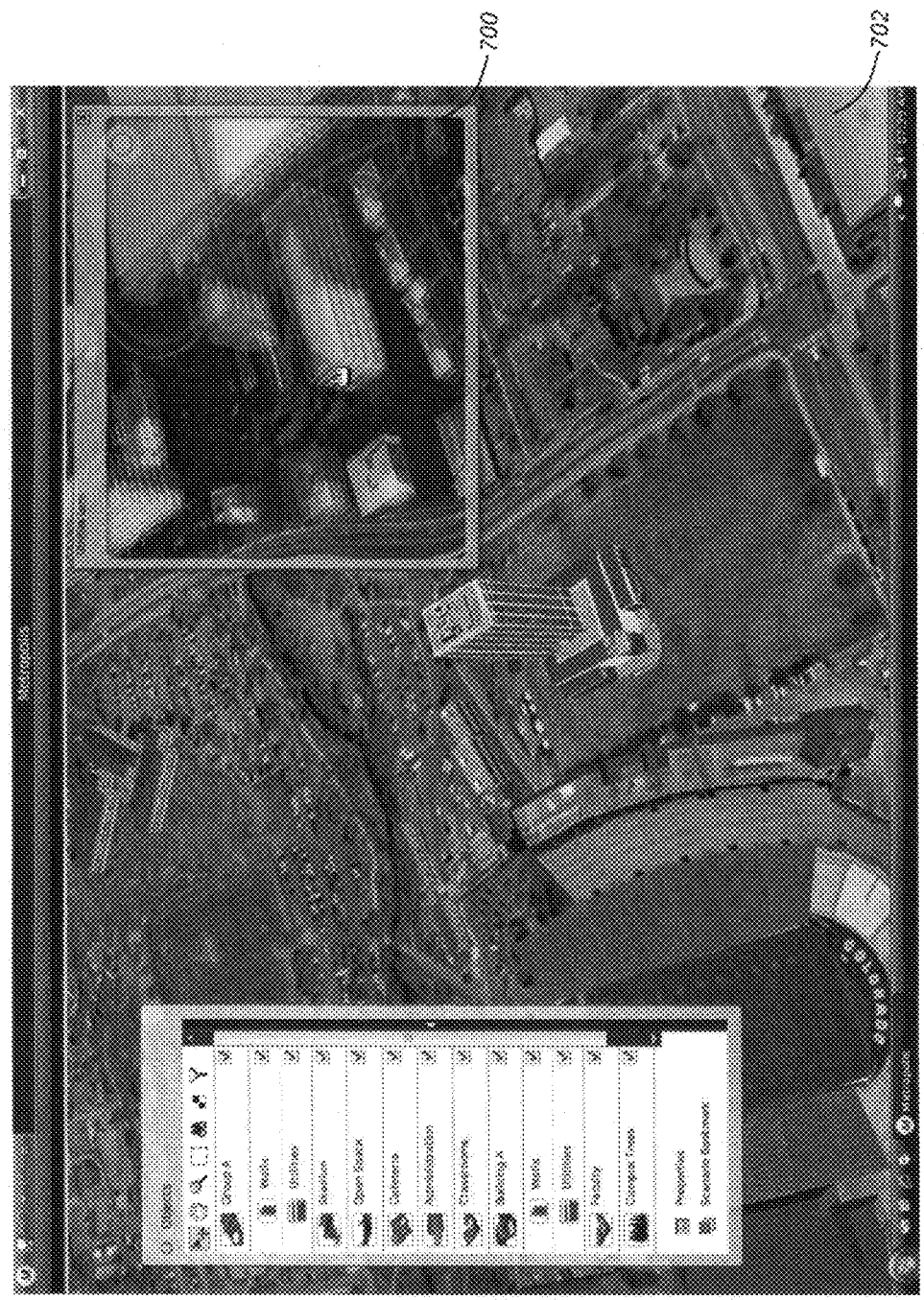
FIG. 8B illustrates the result after the lens of FIG. 7 is dragged/moved to the upper right corner of the main data representation display in accordance with one or more embodiments of the invention.

The user can also drag and resize the lens 700 around the display to dynamically reveal the underlying data. FIG. 8A illustrates the result after the lens 700 is dragged/moved to the lower left corner of the main data representation display 702. Similarly, FIG. 8B illustrates the result after the lens 700 is dragged/moved to the upper right corner of the main data representation display 702. As the lens 700 is dragged, the content displayed within lens 700 is automatically and dynamically updated to display the alternate data representation contained therein.

In addition, the lens 700 may also have a degree of transparency/opacity so that a degree of the underlying/main data representation 702 can be seen within lens 700. The user may or may not have the ability to alter the degree of opacity of the lens 700. While a degree of transparency may be utilized, one or more embodiments of the invention do not provide any transparency within lens 700. Instead, a completely alternate data representation is provided and as the lens 700 is moved around display 702, the alternate data representation is lined up or overlaid precisely so that it appears as if the main data representation 702 is being viewed when in fact a completely different representation of the data is viewed within lens 700.

Figure 9:
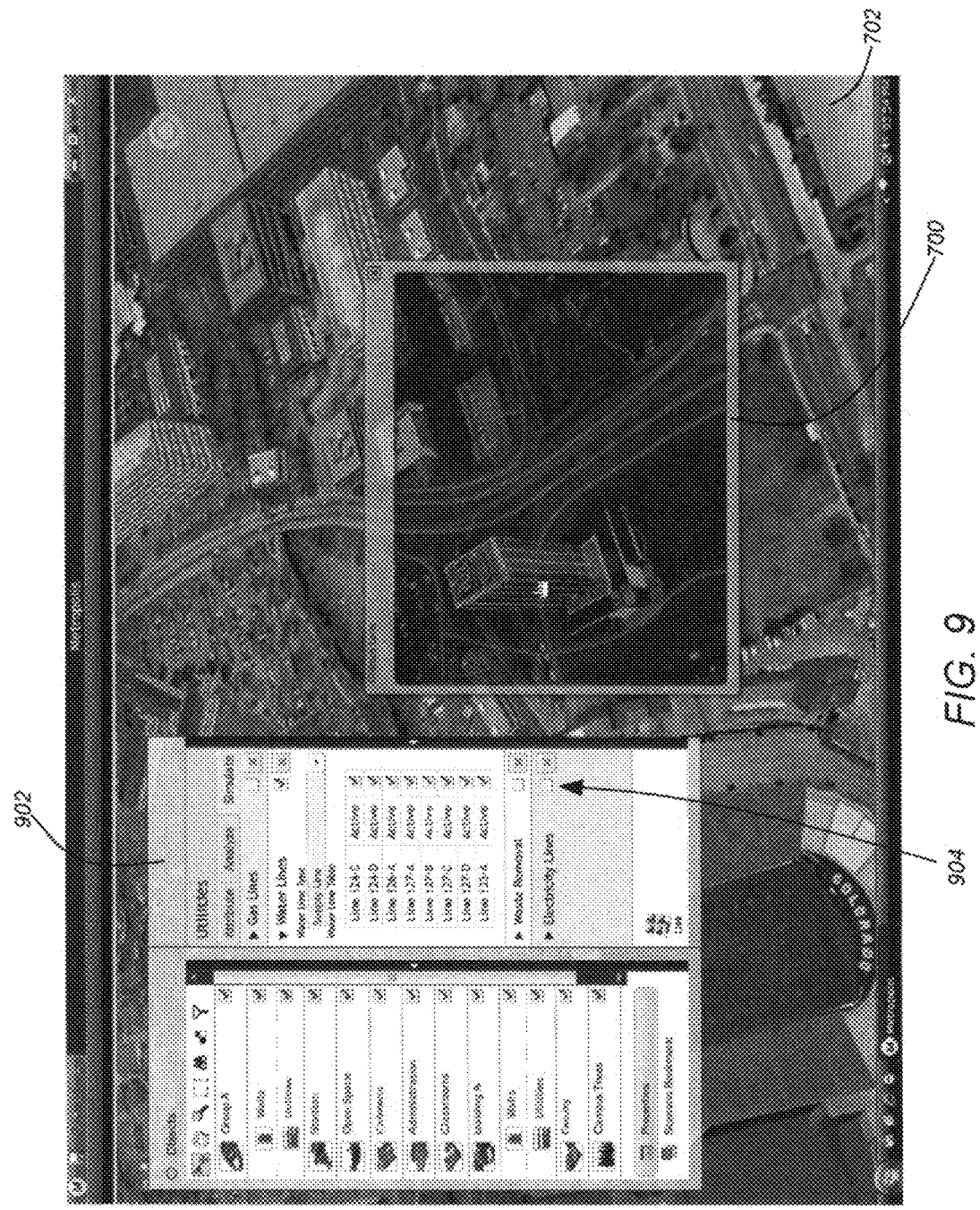
FIG. 9 illustrates the user isolating a subset of the utility layers with the ability to manipulate and view just the water supply (displayed in blue) in accordance with one or more embodiments of the invention.

The user may also be free to interact concurrently with the main data representation 702 and any alternates shown within lenses 702. FIG. 9 illustrates the user isolating a subset of the utility layers with the ability to manipulate and view just the water supply (displayed in blue) in accordance with one or more embodiments of the invention. Panel 902 illustrates the settings for the utilities lens 700. The check boxes 904 indicate whether the corresponding object/entity appears in the visualization within the utility lens 700. As illustrated, the user has elected to turn off the simulation/visualization for the gas line, waste removal, and electricity lines (e.g., by removing the check from the checkboxes 904 corresponding to those elements—using a cursor control device). The user has elected to display the simulation/visualization for the water lines. In addition, the user has elected to display the simulation/visualization for specific water lines that are listed in panel 902. The user could also opt to remove one or more of the specific water supply lines from the display by unchecking the appropriate checkbox 904.

In addition to selecting which utility to display in the simulation/visualization, the user may also set the colors that will be displayed and the opacity levels for each utility. Further, the utilities and/or water lines are dynamically updated within the utility lens 700 as the user checks/unchecks the desired checkbox(es) 902 and establishes/defines the appropriate/desired display attributes. Further, although not shown, the user can also opt to simulate the utility usage over time.

In view of the above, the lens 700 is unique in that it allows for interactive rendering within a data file, possibly containing several different plug-ins for several different file formats, of specific layers selected by the user. In this regard, each utility or other type of entity to be displayed may be viewed as a layer of the 3D scene and the lens 700 allows the user to view a subset of those layers. Interactive viewing of selected layers allows a user to move the lens 700 back and forth over an area 702 to view the underlying levels. This step in previous applications would have taken several different key strokes, several different file save operations and possibly several different renderings.

In addition to the ability to see alternate views of data, a lens 700 may also give the user the ability to search based on the shape of the file. For example, a user who is searching a building for a specific garage door would be able to specify that shape and see the shape highlighted in the drawing. Another example would be searching for a standard fire hydrant in a city block in order to determine best line of defense in the event of a fire, or determine a fire lane.

Logical Flow

Figure 10:
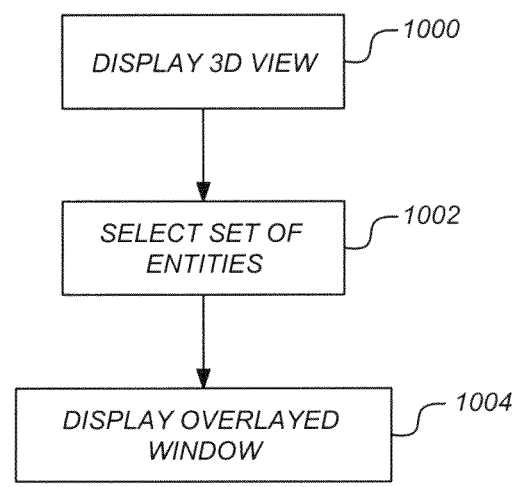
FIG. 10 is a flow chart illustrating the logical flow for displaying a window containing an alternate data representation in a 3D system in accordance with one or more embodiments of the invention.

FIG. 10 is a flow chart illustrating the logical flow for displaying a window containing an alternate data representation in a 3D system in accordance with one or more embodiments of the invention. At step 1000, a first 3D view of a real world scene is displayed on a display device (e.g., using a 3D graphics application). The first 3D view is a first set of data layers.

At step 1002, a set of entities are selected that together define an alternate representation of the first 3D view. The alternate representation is a second set of data layers that is different that the first set of data layers and the second set of data layers consists of the set of selected entities. Entities from a variety of different formats and/or different data types may be selected as part of the set. The layers of data selected may not be visible in the first 3D view but may instead reflect data that is underneath the current viewable layer. Further, the set of entities may be a composite of multiple different layers or entities. The lens application will allow the user to drill down past the main viewable area to view data in layers through the window as if the lens is a filter or x-ray view revealing the set of entities selected by the user.

At step 1004, an overlayed window is displayed on top of the first 3D view. The overlayed window displays the alternate representation of the real world scene. The overlayed window may be moved around the 3D view by the user while automatically (e.g., without additional user input) and dynamically (i.e., in real time) revealing the alternate representation of the real world scene within the overlayed window. As illustrated in FIGS. 7, 8A, 8B, and 9, the selected data may be displayed in a highlighted manner such that it is clearly distinguishable from other data within the lens 700 thereby providing a context for the data. Accordingly, the background within lens 700 may appear dimmed or in a darker color compared to the alternate data that is highlighted in the overlayed window.

As described above, the 3D graphics application may consist of a utility lens feature or plug-in where the set of entities are selectable from a panel illustrating public utilities that may be displayed in the 3D view. The selected set of entities is a selected subset of the public utilities and the alternate representation is a color-coded display of the selected subset of public utilities. The color-coded display may be color coded based on usage of the selected public utilities. For example, the color and intensity of the color may reflect the usage of the particular entity identified by the color. More specifically, a darker or more intense blue color may reflect an increased flow of water at the location identified in the 3D view. Alternatively, a dimmer or lighter blue may reflect a lower flow.

The public utilities that may be selectable can include gas lines that consists of individual gas lines, water lines consisting of individual water lines, waste removal consisting of individual waste removal/sewage lines, and electricity lines consisting of individual electric lines. The selected subset may consist of a selection of a subset of individual lines from the public utilities.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented method for displaying a window containing an alternate data representation in a three-dimensional system, comprising:
   (a) obtaining, in a three-dimensional (3D) graphics application, a real world geospatial scene, wherein the real world geospatial scene comprises multiple data layers;
   (b) displaying, using the 3D graphics application, a first 3D view of the real world geospatial scene on a display device, wherein the first 3D view is comprised of a first set of data layers selected from the multiple data layers;
   (c) selecting, in the 3D graphics application, a set of entities that together define an alternate representation of the first 3D view, wherein:
      (i) the alternate representation comprises a second set of data layers selected from the multiple data layers;

(ii) the second set of data layers is different than the first set of data layers;

(iii) the second set of data layers is comprised of the set of selected entities;

(iv) the selecting is performed as part of a public utility lens feature;

(v) the set of entities are selectable from a panel illustrating public utilities that may be displayed in the first 3D view; and (vi) the selected set of entities comprises a selected subset of one or more public utilities; and (d) displaying, using the 3D graphics application, an overlayed lens window on top of the first 3D view, wherein:

(i) the overlayed lens window displays the alternate representation of the real world geospatial scene that comprises a color-coded display of the selected subset of public utilities; and (ii) the overlaid lens window is precisely lined up over the first 3D view so that it appears as if the first set of data layers is being viewed but the alternate representation comprised of the second set of data layers is displayed within the overlaid lens window instead.

2. The method of claim 1, wherein the color-coded display is color-coded based on usage of the selected public utilities.

3. The method of claim 1, wherein the public utilities comprise:

gas lines comprised of individual gas lines;

water lines comprised of individual water lines;

waste removal comprised of individual waste removal lines; and electricity lines comprised of individual electricity lines.

4. The method of claim 3, wherein the selected subset comprises a selection of a subset of individual lines from the public utilities.

5. The method of claim 1, further comprising moving the overlayed lens window around the 3D view to automatically and dynamically reveal the alternate representation of the real world geospatial scene within the overlayed lens window.

6. An apparatus for displaying a window containing an alternate data representation in a three-dimensional system in a computer system comprising:

(a) a computer having a memory;

(b) a three-dimensional (3D) graphics application executing on the computer, wherein the 3D graphics application comprises a public utility lens feature that is configured to:

(i) obtain a real world geospatial scene, wherein the real world geospatial scene comprises multiple data layers;

(ii) display a first 3D view of the real world geospatial scene on a display device, wherein the first 3D view is comprised of a first set of data layers selected from the multiple data layers;

(iii) select a set of entities that together define an alternate representation of the first 3D view, wherein:

(1) the alternate representation comprises a second set of data layers selected from the multiple data layers;

(2) the second set of data layers is different than the first set of data layers;

(3) the second set of data layers is comprised of the set of selected entities; (4) the set of entities are selectable from a panel illustrating public utilities that may be displayed in the first 3D view; and (5) the selected set of entities comprises a selected subset of one or more public utilities; and (iv) display an overlayed lens window on top of the first 3D view, wherein:

(1) the overlayed lens window displays the alternate representation of the real world geospatial scene that comprises a color-coded display of the selected subset of public utilities; and (2) the overlaid lens window is precisely lined up over the first 3D view so that it appears as if the first set of data layers is being viewed but the alternate representation comprised of the second set of data layers is displayed within the overlaid lens window instead.

7. The apparatus of claim 6, wherein the color-coded display is color-coded based on usage of the selected public utilities.

8. The apparatus of claim 6, wherein the public utilities comprise:

gas lines comprised of individual gas lines;

water lines comprised of individual water lines;

waste removal comprised of individual waste removal lines; and electricity lines comprised of individual electricity lines.

9. The apparatus of claim 8, wherein the selected subset comprises a selection of a subset of individual lines from the public utilities.

10. The apparatus of claim 6, wherein the application is further configured to move the overlayed lens window around the 3D view to automatically and dynamically reveal the alternate representation of the real world geospatial scene within the overlayed lens window.

11. An article of manufacture comprising a program storage device readable by a computer, tangibly embodying at least one program of instructions executable by the computer to perform method steps of displaying a window containing an alternate data representation in a three-dimensional system, the method steps comprising the steps of:

(a) obtaining, in a three-dimensional (3D) graphics application, a real world geospatial scene, wherein the 3D graphics application comprises a public utility lens feature and wherein the real world geospatial scene comprises multiple data layers;

(b) displaying, using the 3D graphics application, a first 3D view of the real world geospatial scene on a display device, wherein the first 3D view is comprised of a first set of data layers selected from the multiple data layers;

(c) selecting, using 3D graphics application, a set of entities that together define an alternate representation of the first 3D view, wherein:

(i) the alternate representation comprises a second set of data layers selected from the multiple data layers;

(ii) the second set of data layers is different than the first set of data layers;

(iii) the second set of data layers is comprised of the set of selected entities;

(iv) the set of entities are selectable from a panel illustrating public utilities that may be displayed in the first 3D view; and (v) the selected set of entities comprises a selected subset of one or more public utilities; and (d) displaying, using the 3D graphics application, an overlayed lens window on top of the first 3D view, wherein:

(i) the overlayed lens window displays the alternate representation of the real world geospatial scene that comprises a color-coded display of the selected subset of public utilities; and (ii) the overlaid lens window is precisely lined up over the first 3D view so that it appears as if the first set of data layers is being viewed but the alternate representation comprised of the second set of data layers is displayed within the overlaid lens window instead.

12. The article of manufacture of claim 11, wherein the color-coded display is color-coded based on usage of the selected public utilities.

13. The article of manufacture of claim 11, wherein the public utilities comprise:
- gas lines comprised of individual gas lines;
- water lines comprised of individual water lines;
- waste removal comprised of individual waste removal lines; and
- electricity lines comprised of individual electricity lines.

14. The article of manufacture of claim 13, wherein the selected subset comprises a selection of a subset of individual lines from the public utilities.

15. The article of manufacture of claim 11, wherein the method steps further comprise the step of moving the overlayed lens window around the 3D view to automatically and dynamically reveal the alternate representation of the real world geospatial scene within the overlayed lens window.

* * * * *